United States Patent
Mundhas

(10) Patent No.: US 10,224,773 B2
(45) Date of Patent: Mar. 5, 2019

(54) ROTOR SEGMENT AND ROTOR OF AN ELECTRIC MACHINE

(71) Applicant: SIEMENS AKTIENGESELLSCHAFT, München (DE)

(72) Inventor: Marcel Mundhas, Grosshelfendorf (DE)

(73) Assignee: Siemens Aktiengesellschaft, München (DE)

( * ) Notice: Subject to any disclaimer, the term of this patent is extended or adjusted under 35 U.S.C. 154(b) by 484 days.

(21) Appl. No.: 15/006,592

(22) Filed: Jan. 26, 2016

(65) Prior Publication Data
US 2016/0218574 A1    Jul. 28, 2016

(30) Foreign Application Priority Data
Jan. 27, 2015    (EP) ..................................... 15152666

(51) Int. Cl.
H02K 1/28 (2006.01)
H02K 1/27 (2006.01)
H02K 15/12 (2006.01)

(52) U.S. Cl.
CPC ............... *H02K 1/28* (2013.01); *H02K 1/278* (2013.01); *H02K 15/12* (2013.01)

(58) Field of Classification Search
CPC ......... H02K 1/2773; H02K 1/278; H02K 1/28
USPC ............ 310/91, 152, 156.01, 156.08, 156.18
See application file for complete search history.

(56) References Cited

U.S. PATENT DOCUMENTS

| 4,942,324 A | * | 7/1990 | Ooyama | H02K 1/26 310/216.007 |
| 5,176,946 A | * | 1/1993 | Wieloch | H01F 27/263 29/598 |
| 2002/0057971 A1 | | 5/2002 | Shida | |
| 2003/0085629 A1 | * | 5/2003 | Van Dine | H02K 1/2773 310/156.08 |
| 2009/0302702 A1 | * | 12/2009 | Pabst | H02K 1/2773 310/156.12 |
| 2011/0012462 A1 | * | 1/2011 | Tsumagari | H02K 1/278 310/156.13 |

(Continued)

FOREIGN PATENT DOCUMENTS

| CN | 103795166 A | 5/2014 |
| CN | 201610051702 | 10/2017 |

(Continued)

*Primary Examiner* — Quyen P Leung
*Assistant Examiner* — Minki Chang
(74) *Attorney, Agent, or Firm* — Henry M. Feiereisen LLC

(57) ABSTRACT

A rotor segment of a rotor of a rotating electrical machine includes at least one stack of segment laminations. The stack is configured as a cylinder having a basal surface in perpendicular relationship to a rotor axis of the rotor and a lateral surface in perpendicular relationship to the basal surface. The segment laminations are identical in shape and stacked in a direction that is parallel to the rotor axis. The basal surface has a basal surface contour which includes a first contour section on a side of the rotor axis, a second contour section opposite to the first contour section, and two third contour sections. Each third contour section connects an end of the first contour section to an end of the second contour section, with the first contour section having at least one essentially dome-shaped support section.

12 Claims, 4 Drawing Sheets

(56) References Cited

U.S. PATENT DOCUMENTS

2011/0204739 A1    8/2011   Rebollo Gomez
2015/0222151 A1*   8/2015   Semken ................. H02K 1/148
                                                              310/216.008

FOREIGN PATENT DOCUMENTS

| DE | 19939061 A1 | 3/2000 |
| DE | 102010023878 A1 | 12/2011 |
| EP | 0818870 A1 | 1/1998 |
| EP | 1300208 A2 | 4/2003 |
| EP | 1508384 A2 | 2/2005 |
| EP | 2712060 A1 | 3/2014 |

* cited by examiner

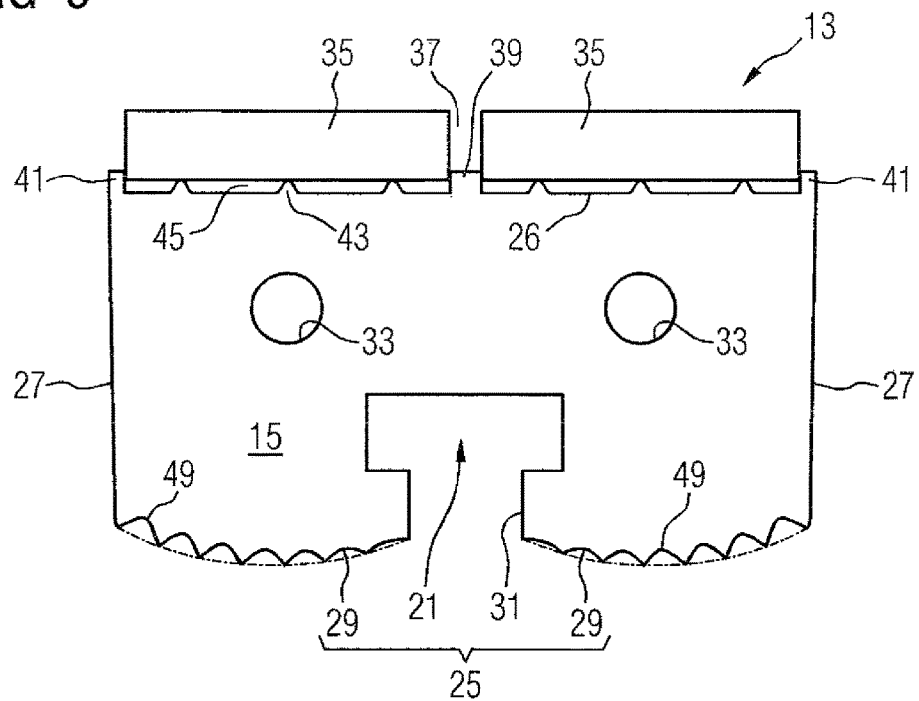
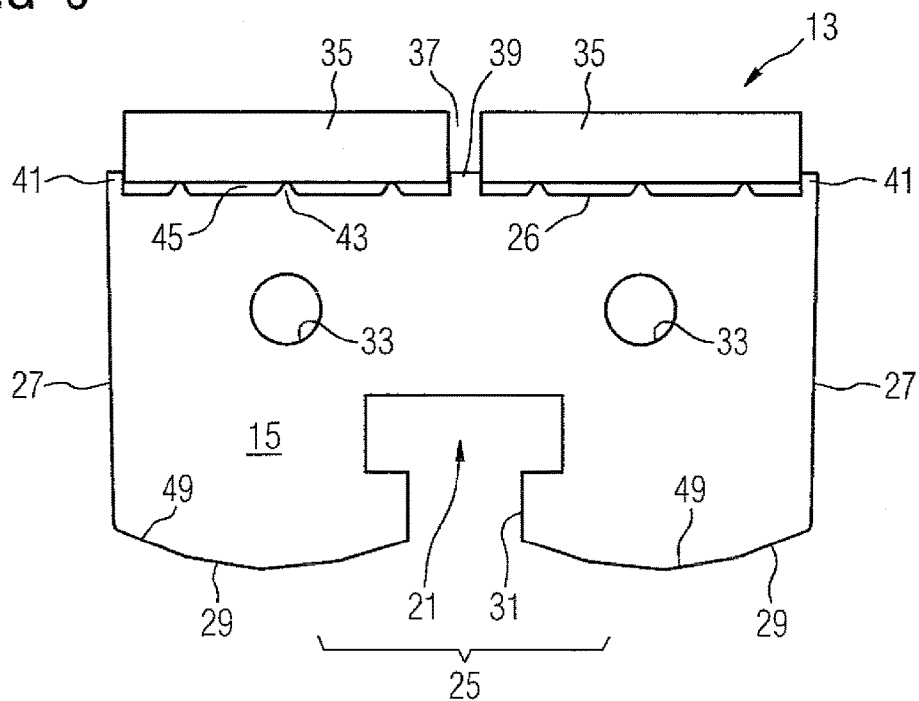

ROTOR SEGMENT AND ROTOR OF AN ELECTRIC MACHINE

CROSS-REFERENCES TO RELATED APPLICATIONS

This application claims the priority of European Patent Application, Serial No. 15152666.2, filed Jan. 27, 2015, pursuant to 35 U.S.C. 119(a)-(d), the disclosure of which is incorporated herein by reference in its entirety as if fully set forth herein.

BACKGROUND OF THE INVENTION

The present invention relates to a rotor segment of a rotor of a rotating electrical machine and to a rotor of a rotating electrical machine.

The following discussion of related art is provided to assist the reader in understanding the advantages of the invention, and is not to be construed as an admission that this related art is prior art to this invention.

Rotors of electrical machines having laminated cores are composed of laminated-core segments of individual rotor segments. Each laminated-core segment is designed as a stack of segment laminations, with the stack being composed of a multiplicity of individual segment laminations, and arranged on a carrier surface of a laminated-core carrier of the rotor. Such laminated-core segments are adapted to the radius of the laminated-core carrier or to the radius of an air gap between the rotor and a stator of an electrical machine. Such laminated-core segments typically rest against the carrier surface in a planar manner, such that any curvature of a contour of a cross section of the laminated-core segments on the carrier-surface side corresponds to the radius of the laminated-core carrier or air gap. This requires a specific contour for each radius. The segment laminations of which such laminated-core segments are composed are cut out by means of a laser cutting system, for example, their contour being adapted to the radius of the respective carrier surface.

It would be desirable and advantageous to address prior art shortcomings.

SUMMARY OF THE INVENTION

According to one aspect of the present invention, a rotor segment of a rotor of a rotating electrical machine includes at least one stack of segment laminations, with the stack being configured as a cylinder having a basal surface in perpendicular relationship to a rotor axis of the rotor and a lateral surface in perpendicular relationship to the basal surface, with the segment laminations being identical in shape and stacked in a direction that is parallel to the rotor axis, wherein the basal surface has a basal surface contour which includes a first contour section on a side of the rotor axis, a second contour section opposite to the first contour section, and two third contour sections, with each third contour section connecting an end of the first contour section to an end of the second contour section, wherein the first contour section has at least one essentially dome-shaped support section.

To ensure clarity, it is necessary to establish the definition of important terms and expressions that will be used throughout this disclosure.

The term "cylinder" relates in general to a body whose volume occupies a three-dimensional space that is traversed by the parallel shifting of a planar contiguous basal surface.

The basal surface is not restricted further in this case, i.e. the basal surface may have any desired basal surface contour and may include holes.

The term "basal surface contour" relates to the contour of a peripheral edge of the basal surface, but not to the contours of any holes that may be present.

The term "dome-shaped section of a basal surface contour" relates to a convex i.e. outwards curving section.

The dome-shaped configuration of a contour section on the rotor-axis side of the basal surface of a cylindrical rotor segment advantageously allows the rotor segment to be arranged without difficulty on cylindrical laminated-core carriers having different radii, since a support surface of the rotor segment does not have to be adapted to the radius of the respective laminated-core carrier. Therefore laminated cores for laminated-core carriers having different radii may be composed of rotor segments of the same type. This makes it simpler and more economical to manufacture the rotor segments, in comparison with the manufacture of rotor segments which are adapted to the radius of the respective laminated-core carrier. In particular, the segment laminations of which the stacks of segment laminations are composed can be produced in greater numbers, e.g. by a punching tool. As a result, production becomes significantly less expensive in comparison with production using a laser cutting system, for example. Moreover, the use of a punching tool allows highly accurate production of the segment laminations, thereby significantly simplifying the finishing of the segment laminations.

According to another advantageous feature of the present invention, the stack of segment laminations can have on the side of the rotor axis a groove in parallel relationship to the rotor axis for accommodating a groove block. This advantageously allows a rotor segment to be fastened to a laminated-core carrier by a groove block.

According to another advantageous feature of the present invention, the first contour section can have two essentially dome-shaped support sections, with the basal surface contour including a center section positioned between the two support sections to delimit a cross sectional area of the groove. Advantageously, the support sections can extend from the center section to the third contour sections, respectively. This configuration is particularly advantageous, since the basal surface contour is dome-shaped on both sides of the groove, such that a support surface is produced on each side of the groove or groove block for carrier surfaces having different radii, and a stable arrangement of the rotor segment on the laminated-core carrier is produced.

According to another advantageous feature of the present invention, at least one support section can have a plurality of concave subsections. Advantageously, the subsections of the at least one support section can be configured such that one of the subsections of any two subsections which is closer to the third contour section has a curvature which is greater than a curvature of the other one of the subsections of the two subsections. This configuration provides for a support section which is itself dome-shaped to have a substructure that features a plurality of concave subsections. It is thereby advantageously possible further to increase the support surface of the rotor segment on the laminated core, since two of the regions of the support section can respectively rest against the carrier surface for various radii of the carrier surface.

According to another advantageous feature of the present invention, at least one support section can have a plurality of straight subsections. As a result, this also renders it possible to further increase the support surface of the rotor segment on the laminated core, since a region of the support section, which region corresponds to a subsection, can respectively rest against the carrier surface in a planar manner for various radii of the carrier surface.

According to another advantageous feature of the present invention, any two adjacent ones of the segment laminations of the at least one stack of segment laminations can be bonded together. In this way, segment laminations are joined in a stable manner to form a stack of segment laminations.

According to another advantageous feature of the present invention, the at least one stack of segment laminations can have an opening extending in parallel relationship to the rotor axis over an entire length of the at least one stack of segment laminations. The presence of such an opening advantageously allows a clamping element to be passed through the stack of segment laminations for the purpose of securing the segment laminations of a stack of segment laminations.

According to another advantageous feature of the present invention, two permanent magnets can be arranged on a rotor-axis-opposite side of the lateral surface of the at least one stack of segment laminations and separated from each other by an intermediate space which extends in parallel relationship to the rotor axis. As a result, the rotor segments can be configured to have two magnetic poles in each case, and combined to form units having a high number of pole pairs.

According to another advantageous feature of the present invention, provision can be made for at least two stacks of segment laminations, with the stacks of segment laminations being connected together by an encapsulating material and spatially fixed relative to each other, such that their basal surfaces lie on a shared plane and their lateral surfaces lie on a same side of the shared plane. Advantageously, the encapsulating material can be e.g. a polyurethane. Accordingly, a plurality of stacks of segment laminations can therefore be connected via an encapsulating material to form a rotor segment. Such rotor segments simplify both the assembly and the transport of the rotor segments, in comparison with rotor segments which only include one stack of segment laminations.

According to another aspect of the present invention, a rotor of a rotating electrical machine includes a laminated-core carrier having a circular cylindrical carrier surface defined by a cylinder axis which coincides with a rotor axis of the rotor, and a laminated core including a plurality of rotor segments, each rotor segment comprising stacks of segment laminations, each stack being configured as a cylinder having a basal surface in perpendicular relationship to a rotor axis of the rotor and a lateral surface in perpendicular relationship to the basal surface, with the segment laminations being identical in shape and stacked in a direction that is parallel to the rotor axis, with the basal surface having a basal surface contour which includes a first contour section on a side of the rotor axis, a second contour section opposite to the first contour section, and two third contour sections, each third contour section connecting an end of the first contour section to an end of the second contour section, with the first contour section having at least one essentially dome-shaped support section, wherein the rotor segments are adjacently arranged on the carrier surface of the laminated-core carrier, such that the basal surfaces of the stacks of segment laminations of the rotor segments are perpendicular to the rotor axis and rest against the laminated-core carrier with their at least one support section.

For the reasons cited above, the laminated core of such a rotor can advantageously be composed of rotor segments whose shape is largely independent of the radius of the carrier surface.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 5 is a schematic frontal view of the rotor segment of FIG. 4; and

FIG. 6 is a schematic frontal view of a fourth exemplary embodiment of a rotor segment according to the present invention.

DETAILED DESCRIPTION OF PREFERRED EMBODIMENTS

Figure 1:
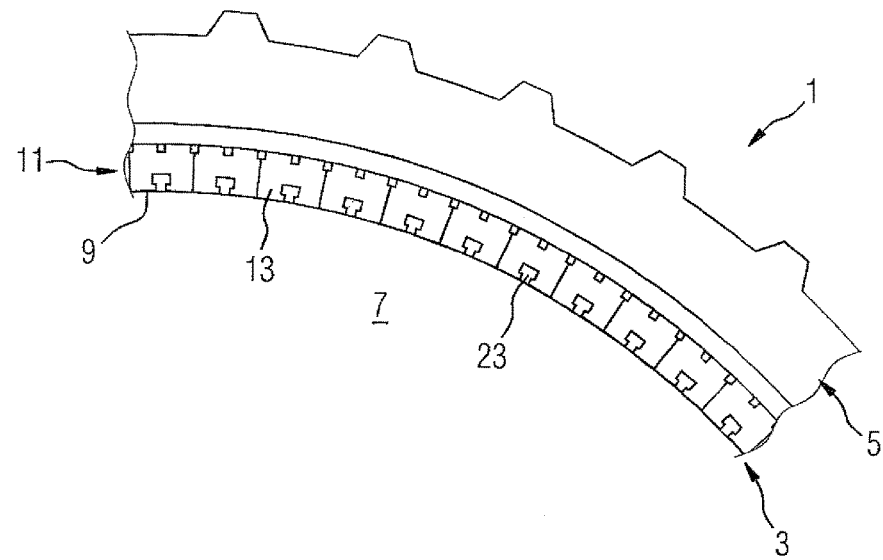
FIG. 1 is a schematic frontal view of a section of a rotating electrical machine having embodied therein the subject matter of the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments may be illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a schematic frontal view of a section of a rotating electrical machine, generally designated by reference numeral 1. The electrical machine 1 has a rotor 3 and a stator 5. The rotor 3 includes a laminated-core carrier 7 having a circular cylindrical carrier surface 9 defining a cylinder axis which coincides with a rotor axis of the rotor 3, with the rotor axis running perpendicular to the drawing plane of FIG. 1, and a laminated core 11 which is composed of stacks of segment laminations 14 of a plurality of rotor segments 13.

Figure 2:
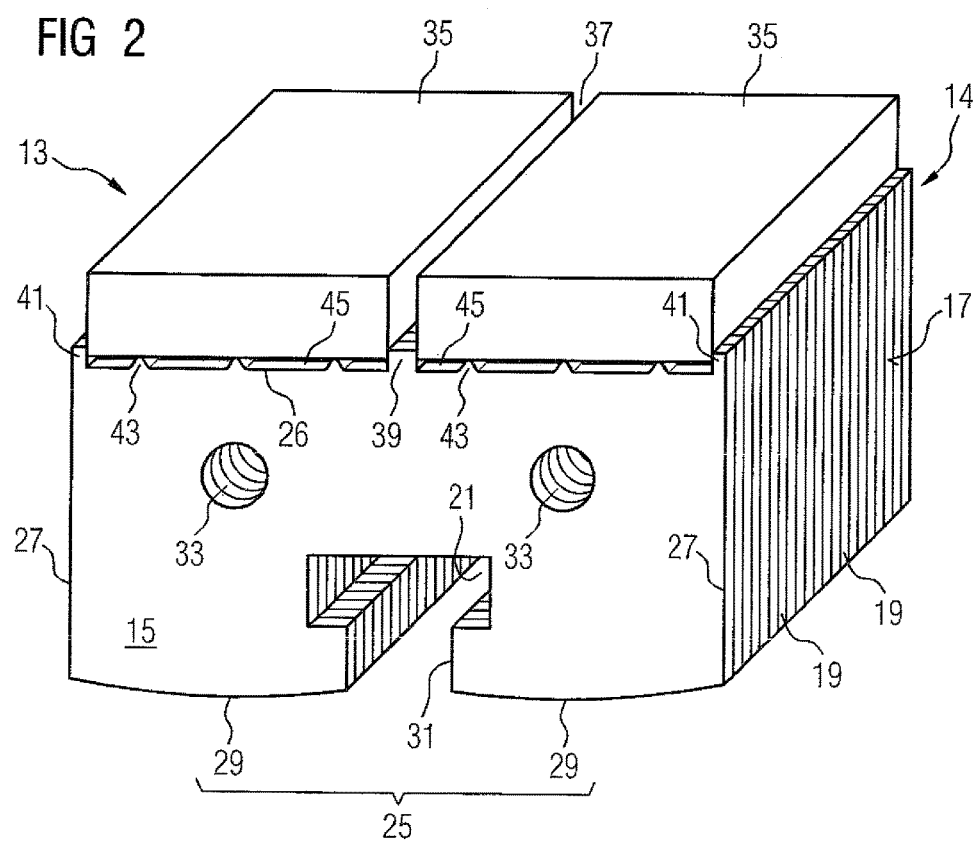
FIG. 2 is a perspective illustration of a first exemplary embodiment of a rotor segment according to the present invention.

FIG. 2 shows a perspective illustration of a first exemplary embodiment of a rotor segment 13 according to the present invention. The rotor segment 13 includes a stack of segment laminations 14, which stack is designed as a cylinder having a basal surface 15 which is perpendicular to the rotor axis, and a lateral surface 17 which is perpendicular to the basal surface 15 and is composed of a multiplicity of identically shaped segment laminations 19 that are stacked along an axial direction which is parallel to the rotor axis. Any two adjacent segment laminations 19 of the stack of segment laminations 14 are bonded together.

On the rotor-axis side, the stack of segment laminations 14 has a groove 21 which runs axially, i.e. parallel to the rotor axis, for accommodating a groove block 23 by which the rotor segment 13 is fastened to the laminated-core carrier 7, e.g. by a screw element which is passed through the groove block 23 and into the laminated-core carrier 7. Each groove 21 has a T-shaped profile, with the base of the groove 21 forming the bar of the T. Each groove block 23 has a T-shaped cross sectional area corresponding to this profile, such that the groove block 23 can be pushed into the groove 21 or the stack of segment laminations 14 can be pushed onto the groove block 23.

The basal surface 15 has a basal surface contour which has a first contour section 25 on the rotor-axis side, a second contour section 26 opposite to the first contour section 25, and two third contour sections 27. Each of the third contour sections 27 connects an end of the first contour section 25 to an end of the second contour section 26. The first contour section 25 has two dome-shaped support sections 29, between which is situated a center section 31 that delimits a cross sectional area of the groove 21, and which extend in each case from the center section 31 to one of the third contour sections 27.

The stack of segment laminations 17 also has two openings 33 which run parallel to the rotor axis and extend over the entire length of the stack of segment laminations 17. The openings 33 are each designed to accommodate a securing element (not shown) that is passed through the opening 33 for the purpose of securing the segment laminations 19.

The rotor segment 13 further includes two cuboid permanent magnets 35, which are arranged on that side of the lateral surface 17 of the stack of segment laminations 14 that is opposite the rotor axis, and which are separated from each other by an intermediate space 37 which extends axially. In this case, unlike magnetic poles of the permanent magnets 35 are situated opposite each other along the intermediate space 37. For the purpose of positioning the permanent magnets 35, that side of the lateral stack surface 17 which is opposite to the rotor axis has an axial central rib 39, and two peripheral ribs 41 which run along an axial edge in each case. Each magnet 35 is inserted in an insertion region of the lateral stack surface 17 between the central rib 39 and one of the peripheral ribs 41. Extending in each of these insertion regions are three axial convexities 43 on which one of the permanent magnets 35 lies. Outside of these convexities 43, adhesive gaps 45 are therefore produced between a permanent magnet 35 and the respective insertion region, and contain an adhesive by which the permanent magnet 35 is adhered to the lateral stack surface 17.

The rotor segments 13 are adjacently arranged on the carrier surface 9 of the laminated-core carrier 7, such that the basal surfaces 15 of the stack of segment laminations 14 of all rotor segments 13 are perpendicular to the rotor axis and rest against the laminated-core carrier 7 with their support sections 29 in each case. Any two adjacent rotor segments 13 are oriented such that their adjacently situated permanent magnets 35 have unlike poles in this case.

When manufacturing the rotor segment 13, the segment laminations 19 are manufactured first by a punching tool, for example, and bonded to the stack of segment laminations 14. The permanent magnets 35 are then adhered to the stack of segment laminations 14.

Figure 3:
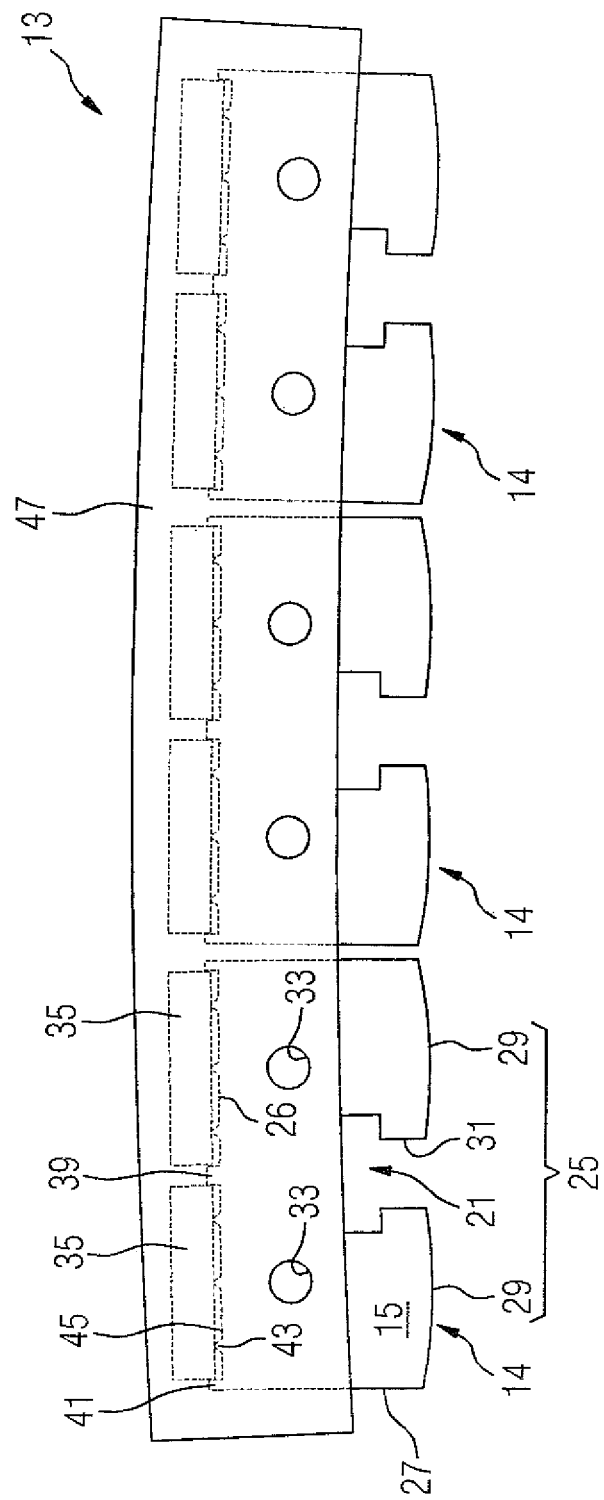
FIG. 3 is a schematic frontal view of a second exemplary embodiment of a rotor segment according to the present invention.

FIG. 3 shows a schematic frontal view of a second exemplary embodiment of a rotor segment 13 according to the present invention. This rotor segment 13 includes three stacks of segment laminations 14, each of which being designed in a same way as the stack of segment laminations 14 in the first exemplary embodiment as illustrated in FIG. 1, and also carries two permanent magnets 35. The three stacks of segment laminations 14 and the permanent magnets 35 are connected together by means of an encapsulating material 47 and are spatially fixed relative to each other, such that their basal surfaces 15 lie on a shared plane and their lateral surfaces 17 lie on the same side of this plane. In this case, the encapsulating material 47 encloses the permanent magnets 35 and a partial region of the stack of segment laminations 14 between the second contour section 26 and the grooves 21 of the stack of segment laminations 14. The encapsulating material 47 is a polyurethane, for example. The rotor segments 13 are adjacently arranged like in FIG. 1 on a carrier surface 9 of a laminated-core carrier 7 of rotor 3, in order thereby to form a laminated core 11 of the rotor 3. The relative position of the stacks of segment laminations 14 of the rotor segment 13 is adapted to the radius of the carrier surface 9.

When manufacturing the rotor segment 13, segment laminations 19 that have been punched out by a punching tool are first combined to form the stacks of segment laminations 14. The stacks of segment laminations 14 are then each equipped with two permanent magnets 35. The stacks of segment laminations 14 of a rotor segment 13 together with the permanent magnets 35 are placed into a casting mold of a shape and size which correspond to the number of stacks of segment laminations 14 of a rotor segment 13 and to their relative positions, and encapsulated by the encapsulating material 47 in the casting mold.

Instead of a rotor segment 13 having three stacks of segment laminations 14 and six permanent magnets 35 as illustrated in FIG. 3, it is, of course, also possible in much the same way to connect a different number of stacks of segment laminations 14 and twice as many permanent magnets 35 by means of encapsulating material 47 to form a rotor segment 13.

Figure 4:
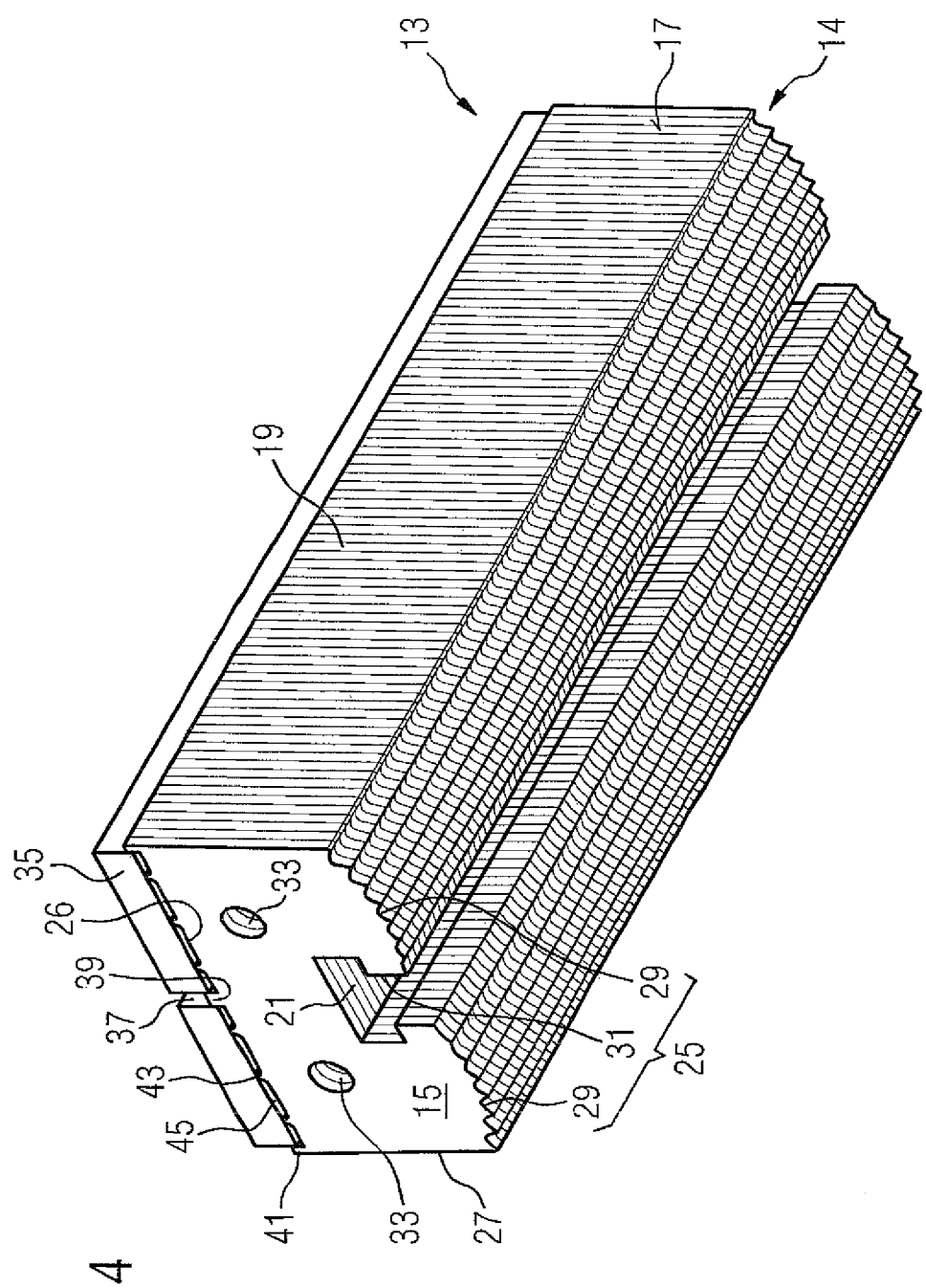
FIG. 4 is a perspective illustration of a third exemplary embodiment of a rotor segment according to the present invention.

FIGS. 4 and 5 show a third exemplary embodiment of a rotor segment 13 according to the present invention, with FIG. 4 showing a perspective illustration and FIG. 5 showing a frontal view.

The exemplary embodiment of the rotor segment 13 as illustrated in FIGS. 4 and 5 differs from the exemplary embodiment illustrated in FIG. 1 in that although the two support sections 29 are still designed to be essentially dome-shaped, they nonetheless each includes a plurality of concave subsections 49. In this case, the subsections 49 of each support section 29 are advantageously designed such that of any two subsections 49, that subsection 49 which is closer to a third contour section 27 has a greater curvature, so that the curvatures of the subsections 49 of each support section 29 increase from the center section 31 to the respectively adjacent third contour section 27. FIGS. 4 and 5 show the support sections 29 with illustrations of the curvatures of the subsections 49 which are highly exaggerated, since a realistic illustration of the support sections 29 would be barely distinguishable from a purely dome-shaped contour.

FIG. 6 shows a frontal view of a fourth exemplary embodiment of a rotor segment 13 according to the present invention. The exemplary embodiment of a rotor segment 13 as illustrated in FIG. 6 differs from the exemplary embodiment illustrated in FIGS. 4 and 5 in that the support sections 29 have straight rather than concave subsections 49. Any two adjacent subsections 49 run in slightly different directions, i.e. form a non-vanishing angle relative to each other, such that each support section 29 is essentially dome-shaped. In FIG. 6, the fourth exemplary embodiment of a rotor segment 13 is only shown schematically, including few subsections 49 and large angles between adjacent subsections 49. Advantageously, each support section 29 of the rotor segment 13 of FIG. 6 has a larger number of subsections 49 and smaller angles between adjacent subsections 49, though the illustration thereof would be barely distinguishable from a purely dome-shaped contour.

Like in FIG. 3, a plurality of stacks of segment laminations 14 from the exemplary embodiments illustrated in FIGS. 4 to 6, each being equipped with two permanent magnets 35, may be connected together by encapsulating material 47 to form a larger rotor segment 13.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A rotor segment of a rotor of a rotating electrical machine, said rotor segment comprising:
    at least one stack of segment laminations, said stack being configured as a cylinder having a basal surface in perpendicular relationship to a rotor axis of the rotor and a lateral surface in perpendicular relationship to the basal surface, said segment laminations being identical in shape and stacked in a direction that is parallel to the rotor axis,
    said basal surface having a basal surface contour which includes a first contour section on a side of the rotor axis, a second contour section opposite to the first contour section, and two third contour sections, each third contour section connecting an end of the first contour section to an end of the second contour section,
    said first contour section having at least one essentially dome-shaped support section having a plurality of concave subsections which are configured such that one of the subsections of any two subsections which is closer to the third contour section has a curvature which is greater than a curvature of the other one of the subsections of the two subsections.

2. The rotor segment of claim 1, wherein the stack of segment laminations has on the side of the rotor axis a groove in parallel relationship to the rotor axis for accommodating a groove block.

3. The rotor segment of claim 2, wherein the first contour section has two of said essentially dome-shaped support section, said basal surface contour including a center section positioned between the two support sections to delimit a cross sectional area of the groove.

4. The rotor segment of claim 3, wherein the support sections extend from the center section to the third contour sections, respectively.

5. The rotor segment of claim 1, wherein the at least one support section has a plurality of concave subsections.

6. The rotor segment of claim 1, wherein the at least one support section has a plurality of straight subsections.

7. The rotor segment of claim 1, wherein any two adjacent ones of the segment laminations of the at least one stack of segment laminations are bonded together.

8. The rotor segment of claim 1, wherein the at least one stack of segment laminations has an opening extending in parallel relationship to the rotor axis over an entire length of the at least one stack of segment laminations.

9. The rotor segment of claim 1, further comprising two permanent magnets arranged on a rotor-axis-opposite side of the lateral surface of the at least one stack of segment laminations and separated from each other by an intermediate space which extends in parallel relationship to the rotor axis.

10. The rotor segment of claim 1, further comprising a further said stack of segment laminations, said stacks of segment laminations being connected together by an encapsulating material and spatially fixed relative to each other, such that their basal surfaces lie on a shared plane and their lateral surfaces lie on a same side of the shared plane.

11. The rotor segment of claim 10, wherein the encapsulating material is a polyurethane.

12. A rotor of a rotating electrical machine, said rotor comprising:
    a laminated-core carrier having a circular cylindrical carrier surface defined by a cylinder axis which coincides with a rotor axis of the rotor; and
    a laminated core including a plurality of rotor segments, each rotor segment comprising stacks of segment laminations, each said stack being configured as a cylinder having a basal surface in perpendicular relationship to a rotor axis of the rotor and a lateral surface in perpendicular relationship to the basal surface, said segment laminations being identical in shape and stacked in a direction that is parallel to the rotor axis, said basal surface having a basal surface contour which includes a first contour section on a side of the rotor axis, a second contour section opposite to the first contour section, and two third contour sections, each third contour section connecting an end of the first contour section to an end of the second contour section, said first contour section having at least one essentially dome-shaped support section having a plurality of concave subsections which are configured such that one of the subsections of any two subsections which is closer to the third contour section has a curvature which is greater than a curvature of the other one of the subsections of the two subsections,
    said rotor segments being adjacently arranged on the carrier surface of the laminated-core carrier, such that the basal surfaces of the stacks of segment laminations of the rotor segments are perpendicular to the rotor axis and rest against the laminated-core carrier with their at least one support section.

\* \* \* \* \*